Jan. 3, 1956 M. EATON 2,729,738
ELECTRIC STEAM GENERATOR
Filed Dec. 27, 1954 2 Sheets-Sheet 1

M. EATON
INVENTOR

BY: D.R. Morrison
AGENT

Jan. 3, 1956    M. EATON    2,729,738
ELECTRIC STEAM GENERATOR
Filed Dec. 27, 1954    2 Sheets-Sheet 2

M. EATON
INVENTOR

BY: D.R. Morrison
AGENT

United States Patent Office 2,729,738
Patented Jan. 3, 1956

2,729,738

ELECTRIC STEAM GENERATOR

Milton Eaton, Shawinigan Falls, Quebec, Canada, assignor to The Shawinigan Water and Power Company, Montreal, Quebec, Canada, a corporation of Quebec Application December 27, 1954, Serial No. 477,828

8 Claims. (Cl. 219—40)

This invention relates to improvements in electric steam generators of the electrode type, herein referred to as electrode boilers. The invention concerns more particularly electrode boilers in which the electrodes are normally partially submerged in the boiler water.

Means for improving the performance of a boiler of this type are described in U. S. Patents 2,453,210 and 2,676,240. The former patent describes a system of automatic control and the latter pertains to water-spout action which is defined as the process of recirculating boiler water, optionally mixing the feed water with it, and spouting the mixture up into hollow electrodes through holes in their tips and out through lateral openings.

It is the principal object of the invention to provide an electrode boiler especially adapted to the application of the apparatus associated with the patented improvements above mentioned. A further object of this invention is to improve the performance of electrode boilers. Other objects will become apparent from the description to follow. With these and other objects in view, the present invention is featured by a novel construction which enables the essential functions to be performed automatically and by means of a minimum amount of apparatus.

The invention will be understood from the following detailed description of preferred embodiments of it, reference being made to the accompanying drawings in which.

Figure 2:
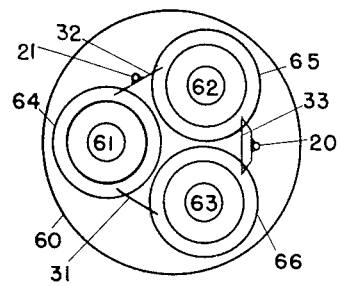
Fig. 2 is a sectional view of the boiler on the line B—B of Fig. 1.

A conventional 3-phase electrode boiler is illustrated by pressure vessel 60 in which electrodes 61, 62 and 63 are suspended from the cover 5 by means of current-carrying parts 11, 12 and 13 (13 is not shown) which are insulated by bushings, illustrated by parts 6 and 7, and extend to external terminals. A feed water supply 68, steam outlet 10 and boiler water bleed connection 25 are other essential parts.

The objects of this invention are attained by the use of novel features providing a multi-compartment boiler within a single pressure vessel. The novel features comprise a horizontal partition extending across the pressure vessel, located above the highest operating water level and below the steam outlet, and at least one vertical partition surrounding the electrodes at a distance and extending from the horizontal partition to a level below the lowest operating water level, the horizontal partition being perforated in the area enclosed by the vertical partition to provide steam communication therethrough, and the vertical partition being adapted to permit water communication to and from the space between the vertical partition and the electrodes. These novel features divide the boiler into a steam generating compartment inside the vertical partition surrounding the electrodes, a steam outlet compartment above the horizontal partition, and a control compartment surrounding the sides of the steam generating compartment comprising the upper part of the space between the outside of the vertical partition and the inside of the pressure vessel. Thus the invention consists of an electrode boiler of the type having at least one electrode normally partially submerged in the boiler water, said boiler containing (1) means for dividing the boiler into (a) a steam outlet compartment at the top of the boiler above the highest operating water level (b) a steam generating compartment surrounding the electrodes, and (c) a control compartment surrounding the sides of the steam generating compartment (2) steam communication between said steam generating and steam outlet compartments, (3) water communication between said steam generating and control compartments, (4) means for regulating the power input by transfer of water between said steam generating and control compartments in response to control means including an outlet for bleeding steam from the top of said control compartment at a constant rate, and (5) means for supplying feed water directly to said steam generating compartment at a rate responsive to the water level in said control compartment.

The novel features are illustrated in the drawings by a horizontal diaphragm plate 50 into which a ground shell 64—65—66 opens and is fitted. The diaphragm plate is conveniently supported by ring 51 preferably welded to the inside of the vessel 60. Suitable means must be provided to make a sealed connection between the diaphragm plate and the ring. It is also necessary that the connection between the upper part of the ground shell and the diaphragm plate be sealed. Conveniently this seal can be a welded connection.

Regulation of the boiler to vary the rate of steam generation is obtained by varying the level of water on the electrodes. Increased rate of steam generation is obtained by transferring water from the space between the outside of the ground shell and the inside of the pressure vessel to the steam generating compartment, inside the ground shell, thus raising the water level on the electrodes. Decreased rate of steam generation is obtained by the reverse transfer, lowering the water level on the electrodes. Steam generated in the generating compartment flows into the steam outlet compartment where its velocity falls, thus releasing entrained boiler water. From the outlet compartment the steam flows through the outlet to its point of consumption.

Figure 1:
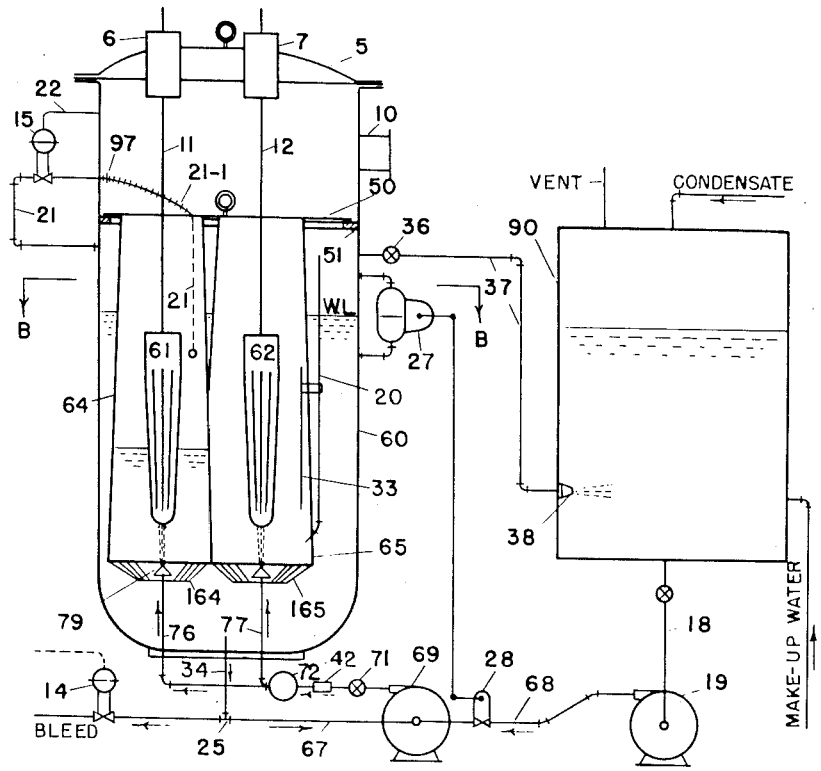
Fig. 1 shows schematically the essential elements of an electrode boiler plus control equipment and communications with a feed water make-up tank.

Automatic regulation of the electrode boiler of this invention is provided by means such as that described in U. S. Patent 2,453,210. The control compartment of the boiler of this invention replaces the separate control pressure vessel of the foregoing patent. Referring to Fig. 1 of this specification and comparing with the drawing in the foregoing patent, the main control valve 15 is in both cases located in pipe 21 which communicates between a point at the upper limit of water level in the steam generating compartment and a point above the highest normal water level in the control compartment or control vessel. In both cases pipe 20 forms a by-pass, around valve 15 and pipe 21, between a point at the lowest limit of water level in the steam generating compartment and the top of the control compartment. Also in both cases feed water regulator 27 and valve 28 control the supply of feed water to the boiler in response to variations in the water level in the control compartment. Both embodiments of the control system provide a constant bleed of steam from the control compartment through valve 36. Fig. 1 of the present specification indicates how steam bled through valve 36 for control purposes is carried by pipe 37 to a water heater 38 in make-up tank 90.

The feed water pump 19 communicates with the make-up tank by means of pipe connection 18.

Bleed valve 14 operates in response to conductivity measuring apparatus to maintain the boiler water conductivity at a predetermined value.

Referring to Fig. 1 of the present specification section 21—1 of pipe 21 is illustrated as being made of flexible tubing and connected at one end with a pipe union 97. This construction provides means for disconnecting pipe 21 when it is desired to remove from the boiler the ground shell assembly including the diaphragm plate.

The connection of pipe 22 indicates that valve 15 is made directly responsive to the boiler steam pressure. Alternatively, with the use of suitable control intruments, the operation of valve 15 may be made responsive to any selected condition, such as the boiler steam pressure, the boiler power input, or the power input to the system of which the boiler load is part.

The equipment for water-spout action is similar to that described in U. S. Patent 2,676,240. A water-circulating pump 69 takes water from the boiler through communications 34 and 67 and discharges the water through valve 71 to a manifold 72 and hence through water spouts 76, 77 and 78 (78 is not shown) and nozzles 79, 80, 81 (only 79 is numbered) located directly under and pointing upwards towards the tips of the electrodes. The spouted water passes up into the hollow electrodes through terminal holes in their tips and out through lateral openings arranged around their sides. Valve 71 serves to adjust the rate at which water is pumped and instrument 42 indicates the rate. The boiler feed water, supplied by pump 19 and controlled by valve 28, is mixed with the recirculated water at the intake of pump 69.

There are numerous alternative constructions of the vertical partition, i. e. ground shell, which can be used in the boiler of this invention, their common feature being that they are sealed at their upper ends to the diaphragm. For example suitable ground shells can be in the form of (a) a single cylinder surrounding the electrodes and extending below them; or (b) separate cylinders surrounding each electrode; or (c) a separate enclosure around each electrode, the enclosure being tapered from a smaller diameter at the diaphragm to a larger diameter at its lower edges; (d) a construction according to (b) or (c) having means for providing low resistance paths for the passage of current between the separate enclosures, such as metal plates welded to the enclosures along lines adjacent to the electrodes, illustrated in Figures 1 and 2 by plates 31, 32, and 33; or (e) a construction according to any of the foregoing and having a metal grid or metal grids fixed across the bottom edges of the ground shell or enclosures for the purpose of preventing electric current reaching the bottom of the boiler where it would cause pitting or corrosion.

Figure 3:
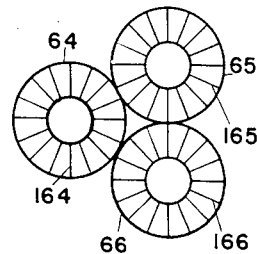
Fig. 3 is a plan view of grids forming parts of the assembly.

Metal grids as described above are illustrated schematically as parts 164, 165, and 166 in Figs. 1 and 3, Fig. 3 being a plan view of the bottom of the ground shells. The grids are preferably made in a truncated-cone shape, as illustrated, in order to increase their mean distance from the tips of the electrodes thus limiting the decrease in the electrical resistance through the boiler water occasioned by their use.

Figure 4:
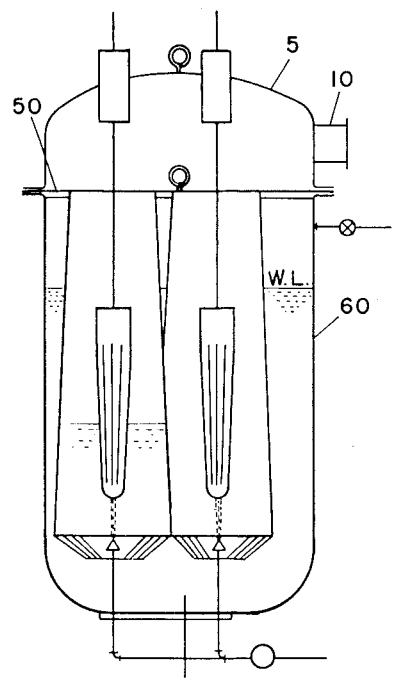
Fig. 4 shows an alternative construction for the upper section of the boiler.

The preferred embodiments of the invention have been described in detail. Numerous modifications can, of course, be made. For example, one or more electrodes may be used in the boiler; each electrode can be enclosed in an individual ground shell, or all electrodes can be enclosed in a single ground shell which can be cylindrical or made with lobes each partially surrounding an electrode; and, when a boiler is intended for operation at low voltages, the equipment for water-spout action can be omitted. Fig. 4 shows an alternative construction of the boiler according to which the removable section 5 includes the steam outlet compartment and extends to the level of the diaphragm plate 50. The diaphragm plate is conveniently sealed and held by gaskets and bolted flanges connecting the top section 5 with the main boiler shell 60.

An electrode boiler constructed according to this invention has many advantages over the boilers of the prior art, some of which are:

1. The main components of the boiler are contained in a single pressure vessel.
2. The steam outlet compartment reduces the velocity of steam discharged from the boiler thus releasing entrained boiler water. A stand pipe at the steam outlet may be used to reduce further the amount of moisture in the steam leaving the boiler.
3. By using tapered ground shells (a) the proportion of the load current taken by the tips of the electrodes is reduced, thus decreasing the rate of corrosion at these points, and (b) the volume of the control compartment is increased at the upper levels where control compartment space is most useful.
4. Stable operation of the boiler depends on steam being dissipated from the control compartment (through valve 36) at a constant rate. Supply of boiler feed water directly to the steam generating compartment prevents accumulation of steam on the electrodes and prevents dissipation of control compartment steam at irregular rates on account of condensation. The water-spout action assists in ensuring that the feed water is heated to steam temperature before it enters the control compartment, thus preventing the dissipation of control compartment steam at a variable rate on account of condensation.

It will also be understood that various additional modifications to those above mentioned may be made in the specific embodiments disclosed without departing from the spirit of the invention or the scope of the claims.

I claim:

1. An electrode boiler of the type having at least one electrode normally partially submerged in the boiler water, said boiler containing (1) means for dividing the boiler into (a) a steam outlet compartment at the top of the boiler above the highest operating water level (b) a steam generating compartment surrounding the electrodes, and (c) a control compartment surrounding the sides of the steam generating compartment (2) steam communication between said steam generating and steam outlet compartments, (3) water communication between said steam generating and control compartments, (4) means for regulating the power input by transfer of water between said steam generating and control compartments in response to control means including an outlet for bleeding steam from the top of said control compartment at a constant rate, and (5) means for supplying feed water directly to said steam generating compartment at a rate responsive to the water level in said control compartment.

2. An electrode boiler as claimed in claim 1, in which the means for dividing the boiler into compartments consists of a horizontal partition located above the highest operating water level and a vertical partition surrounding the electrodes and extending from the horizontal partition to a level below the lowest operating water level, the horizontal partition being perforated in the area enclosed by the vertical partition.

3. An electrode boiler as claimed in claim 1, in which the means for dividing the boiler into compartments consists of a horizontal partition located above the highest operating water level and vertical partitions each surrounding a separate electrode and extending from the horizontal partition to a level below the lowest operating water level, the horizontal partition being perforated in the area enclosed by each vertical partition.

4. An electrode boiler as claimed in claim 3 wherein the vertical partitions are tapered from a smaller diameter at the top to a larger diameter at the bottom.

5. An electrode boiler as claimed in claim 4, having a metal grid fixed across the bottom edge of each vertical partition.

6. An electrode boiler as claimed in claim 5, in which the electrodes are hollow with lateral and terminal openings for the passage therethrough of water, and including pumping means to spout boiler water up under each electrode with sufficient volume and velocity to enter the terminal openings of the electrodes and flow out through the lateral openings.

7. An electrode boiler as claimed in claim 6, including means to direct the boiler feed water into the spouted boiler water, whereby the feed water enters directly into the steam generating compartment of the boiler.

8. In an electrode boiler of the type having at least one electrode normally partially submerged in the boiler water and control means to regulate the power input to the boiler by varying the water level on the electrodes, the improvements which consist of (a) a horizontal partition located below the steam outlet and above the highest operating water level to divide the boiler into an upper steam outlet compartment and a lower section, (b) a vertical partition sealed into the horizontal partition to surround the electrodes and extend below the lowest operating water level, dividing said lower section into a steam generating compartment around the electrodes and a control compartment surrounding the steam generating compartments, (c) steam communication between said steam generating compartment and steam outlet compartment, (d) water communication between said steam generating compartment and control compartment, (e) outlet means to bleed steam from said control compartment at a uniform rate, (f) controllable steam communication means between the highest operating water level in the steam generating compartment and the control compartment above the water level therein, said communication being controlled in response to a selected condition, and (g) steam communication means between a point at the lowest operating water level in the steam generating compartment and the control compartment above the water level therein.

References Cited in the file of this patent

UNITED STATES PATENTS

| | | |
|---|---|---|
| 2,453,211 | Eaton | Nov. 9, 1948 |
| 2,605,381 | Head | July 29, 1952 |
| 2,623,980 | Toensfeldt | Dec. 30, 1952 |